(12) United States Patent
Yang

(10) Patent No.: US 12,382,382 B2
(45) Date of Patent: Aug. 5, 2025

(54) NETWORK SLICE CONNECTION METHOD, TERMINAL, AND COMPUTER-READABLE STORAGE MEDIUM

(71) Applicant: ZTE CORPORATION, Shenzhen (CN)

(72) Inventor: Haicheng Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 518 days.

(21) Appl. No.: 17/997,860

(22) PCT Filed: Aug. 25, 2021

(86) PCT No.: PCT/CN2021/099200
§ 371 (c)(1),
(2) Date: Nov. 3, 2022

(87) PCT Pub. No.: WO2022/041923
PCT Pub. Date: Mar. 3, 2022

(65) Prior Publication Data
US 2023/0156586 A1    May 18, 2023

(30) Foreign Application Priority Data
Aug. 27, 2020   (CN) .......................... 202010877124.3

(51) Int. Cl.
*H04W 48/18* (2009.01)
*H04W 8/22* (2009.01)

(52) U.S. Cl.
CPC ............. *H04W 48/18* (2013.01); *H04W 8/22* (2013.01)

(58) Field of Classification Search
CPC ....... H04W 48/18; H04W 8/22; H04W 48/14; H04W 76/12; H04W 48/16; H04W 16/10; H04W 48/08
See application file for complete search history.

(56) References Cited

U.S. PATENT DOCUMENTS

| 2019/0082326 A1* | 3/2019 | Mathison | ................ H04W 8/18 |
| 2019/0174321 A1* | 6/2019 | Sun | ........................ H04W 16/02 |

(Continued)

FOREIGN PATENT DOCUMENTS

| CN | 107835104 A | 3/2018 |
| CN | 109561434 A | 4/2019 |

(Continued)

OTHER PUBLICATIONS

ZTE, "Network Slice Selection Procedure", 3GPP TSG RAN WG3 Meeting #92, R3-161107 (Year: 2016).*

(Continued)

*Primary Examiner* — Ayaz R Sheikh
*Assistant Examiner* — Mang Boi Thawng
(74) *Attorney, Agent, or Firm* — Vivacqua Crane, PLLC

(57) ABSTRACT

Disclosed are a network slice connection method, a terminal device, and a computer-readable storage medium. The network slice connection method may include: acquiring, in response to acquiring a slice connection triggering signal, first network slice information and device information of the terminal device in the device group and generating a terminal device identifier list according to the device information; acquiring, in response to acquiring selection information indicating a selection of a target terminal device identifier from the terminal device identifier list, device information of a target terminal device corresponding to the target terminal device identifier according to the selection information; and transmitting the first network slice information and the device information of the target terminal device to a server, such that the server connects the target terminal device to a network slice according to the first network slice information and the device information of the target terminal device.

15 Claims, 9 Drawing Sheets

(56) References Cited

U.S. PATENT DOCUMENTS

| | | | | |
|---|---|---|---|---|
| 2019/0357136 A1* | 11/2019 | Li | ............... | H04W 48/18 |
| 2020/0275255 A1* | 8/2020 | Wang | ............... | H04W 60/04 |
| 2022/0210729 A1* | 6/2022 | Yu | ............... | H04W 28/0268 |
| 2022/0240173 A1* | 7/2022 | Wang | ............... | H04W 48/18 |
| 2022/0369391 A1* | 11/2022 | Hong | ............... | H04W 68/005 |
| 2023/0103085 A1* | 3/2023 | Ni | ............... | H04W 72/543 |
| | | | | 370/329 |

FOREIGN PATENT DOCUMENTS

| | | |
|---|---|---|
| CN | 109565747 A | 4/2019 |
| WO | 2019029235 A1 | 2/2019 |
| WO | 2019072058 A1 | 4/2019 |

OTHER PUBLICATIONS

International Searching Authority. International Search Report and Written Opinion for PCT Application No. PCT/CN2021/099200 and English translation, mailed Sep. 9, 2021, pp. 1-10.
European Patent Office. Extended European Search Report for EP Application No. 21859767.2, mailed Oct. 20, 2023, pp. 1-10.

\* cited by examiner

NETWORK SLICE CONNECTION METHOD, TERMINAL, AND COMPUTER-READABLE STORAGE MEDIUM

CROSS-REFERENCE TO RELATED APPLICATION

This application is a national stage filing under 35 U.S.C. § 371 of international application number PCT/CN2021/099200, filed Aug. 25, 2021, which claims priority to Chinese patent application No. 202010877124.3, filed Aug. 27, 2020. The contents of these applications are incorporated herein by reference in their entirety.

TECHNICAL FIELD

Embodiments of the present application relate to, but not limited to, the technical field of communications, and more particularly, to a network slice connection method, a terminal device, and a computer-readable storage medium.

BACKGROUND

When opening an account, a 5G user subscribes to one or more network slices on a core network. When accessing a 5G network, a terminal device transmits Single Network Slice Selection Assistance Information (S-NSSAI) of one or more subscribed network slices to the network side according to requirements. Therefore, according to the S-NSSAI, the network side may determine a network slice that the terminal device intends to access, and connect the terminal device to the network slice.

With the advance of society and the development of technologies, consumer electronic products have been gradually transformed from high-end consumer goods to daily necessities, and have penetrated into the daily life of ordinary consumers. Consumer electronic products such as smart phones, watch phones, and projectors have become quite popular. An ordinary family often possesses at least three consumer electronic products. At present, when a terminal device applies to the network side for connecting to a network slice, the terminal device can only apply for a network slice for itself. When multiple terminal devices in a family have a service connection requirement (e.g., during live streaming, a game battle, etc.), each terminal device needs to separately apply to the network side for connecting to a network slice, thus affecting the user experience.

SUMMARY

The following is a summary of some subject matters set forth in this description. This summary is not intended to limit the scope of protection of the claims.

Embodiments of the present application provide a network slice connection method, a terminal device, and a computer-readable storage medium.

In accordance with an aspect of the present application, an embodiment provides a network slice connection method, which is applicable to a terminal device in a same device group. The method includes: acquiring first network slice information and device information of the terminal device in the device group and generating a terminal device identifier list according to the device information, in response to receiving a slice connection triggering signal; acquiring, in response to receiving selection information indicating a selection of a target terminal device identifier from the terminal device identifier list, device information of a target terminal device corresponding to the target terminal device identifier according to the selection information; and transmitting the first network slice information and the device information of the target terminal device to a server, such that the server connects the target terminal device to a network slice related to the first network slice information according to the first network slice information and the device information of the target terminal device.

In accordance with another aspect of the present application, an embodiment further provides a terminal device. The terminal device includes: a memory, a processor, and a computer program stored in the memory and executable by the processor which, when executed by the processor, causes the processor to implement the network slice connection method described above.

In accordance with another aspect of the present application, an embodiment further provides a computer-readable storage medium, storing computer-executable instructions which, when executed by a processor, cause the processor to implement the network slice connection method described above.

Additional features and advantages of the present application will be set forth in the description which follows, and in part will be obvious from the description, or may be learned by the practice of the present application. The objects and other advantages of the present application can be realized and obtained by the structures particularly pointed out in the description, claims and drawings.

BRIEF DESCRIPTION OF DRAWINGS

The drawings are provided for a further understanding of the technical schemes of the present application, and constitute a part of the description. The drawings and the embodiments of the present application are used to illustrate the technical schemes of the present application, and do not constitute a limitation on the technical schemes of the present application.

DETAILED DESCRIPTION

To make the objects, technical schemes, and advantages of the present application clear, the present application is described in further detail with reference to accompanying drawings and examples. It should be understood that the embodiments described herein are merely used for illustrating the present application, and are not intended to limit the present application.

It is to be noted, although functional modules have been divided in the schematic diagrams of devices and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

The present application provides a network slice connection method, a terminal device, and a computer-readable storage medium. The terminal device acquires first network slice information and device information of the terminal device in the device group and generates a terminal device identifier list according to the device information when receiving a slice connection triggering signal. When receiving selection information indicating a selection of a target terminal device identifier from the terminal device identifier list, the terminal device acquires device information of a target terminal device corresponding to the target terminal device identifier according to the selection information, and transmits the first network slice information and the device information of the target terminal device to a server, such that the server connects the target terminal device to a network slice according to the first network slice information and the device information of the target terminal device. Therefore, by utilizing only one terminal device, the user can realize the connection of target terminal devices belonging to the same device group as the terminal device to a network slice, and the terminal devices do not need to separately apply to the server for connecting to a network slice, thereby improving user experience.

The embodiments of the present application will be further described in detail below with reference to the accompanying drawings.

Figure 1:
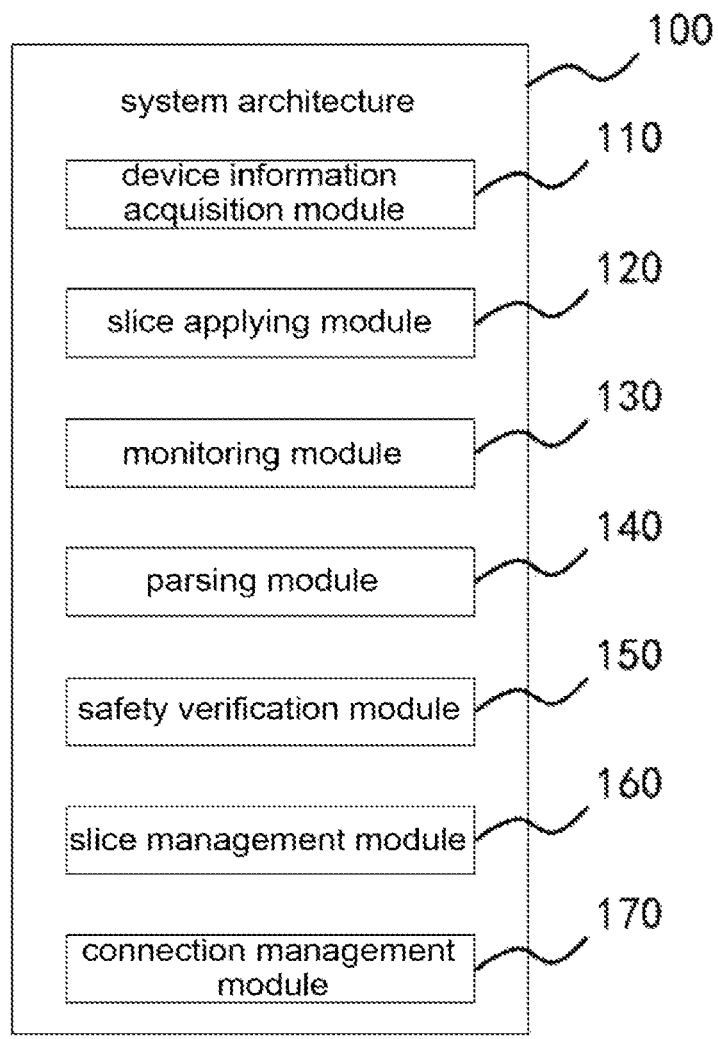
FIG. 1 is a schematic diagram of a system architecture configured for executing a network slice connection method according to an embodiment of the present application.

As shown in FIG. 1, FIG. 1 is a schematic diagram of a system architecture configured for executing a network slice connection method according to an embodiment of the present application. In the example of FIG. 1, the system architecture 100 includes a device information acquisition module 110, a slice applying module 120, a monitoring module 130, a parsing module 140, a security verification module 150, a slice management module 160 and a connection management module 170.

The device information acquisition module 110 is configured for acquiring device information of terminal devices in a same device group. For example, if a current terminal device stores the device information of all the terminal devices in the same device group, the device information acquisition module 110 may directly acquire the device information of these terminal devices from the current terminal device. If the current terminal device does not store the device information of all the terminal devices in the same device group, the device information acquisition module 110 may acquire the device information of these terminal devices from a server. The slice applying module 120 is configured for applying for connecting another terminal device in the same device group to a network slice. The monitoring module 130 is configured for monitoring whether a device trigger message from a network side is received. The device trigger message carries relevant information when the terminal device initiates a Protocol Data Unit (PDU) session establishment request, e.g., a Data Network Name (DNN), a terminal device identifier, and the like. The parsing module 140 is configured for parsing the device trigger message after receiving the device trigger message from the network side, to obtain contents carried in the device trigger message. The security verification module 150 is configured for checking security of the contents carried in the device trigger message after obtaining the contents carried in the device trigger message. The slice management module 160 is configured for applying for, maintaining or releasing a network slice for the current terminal device. The connection management module 170 is configured for configuring related network ports and routes when connecting to the network slice.

The system architecture and application scenarios described in the embodiments of the present application are for the purpose of illustrating the technical schemes of the embodiments of the present application clearly, and do not constitute a limitation on the technical schemes provided in the embodiments of the present application. Those having ordinary skills in the art may know that with the evolution of the system architecture and the emergence of new application scenarios, the technical schemes provided in the embodiments of the present application are also applicable to similar technical problems.

Those having ordinary skills in the art may understand that the structure of the system architecture 100 shown in FIG. 1 do not constitute a limitation to the embodiments of the present application, and more or fewer components than those shown in the figure may be included, or some components may be combined, or a different component arrangement may be adopted.

Based on the structure of the above-mentioned system architecture, various embodiments of the network slice connection method of the present application are proposed.

Figure 2:
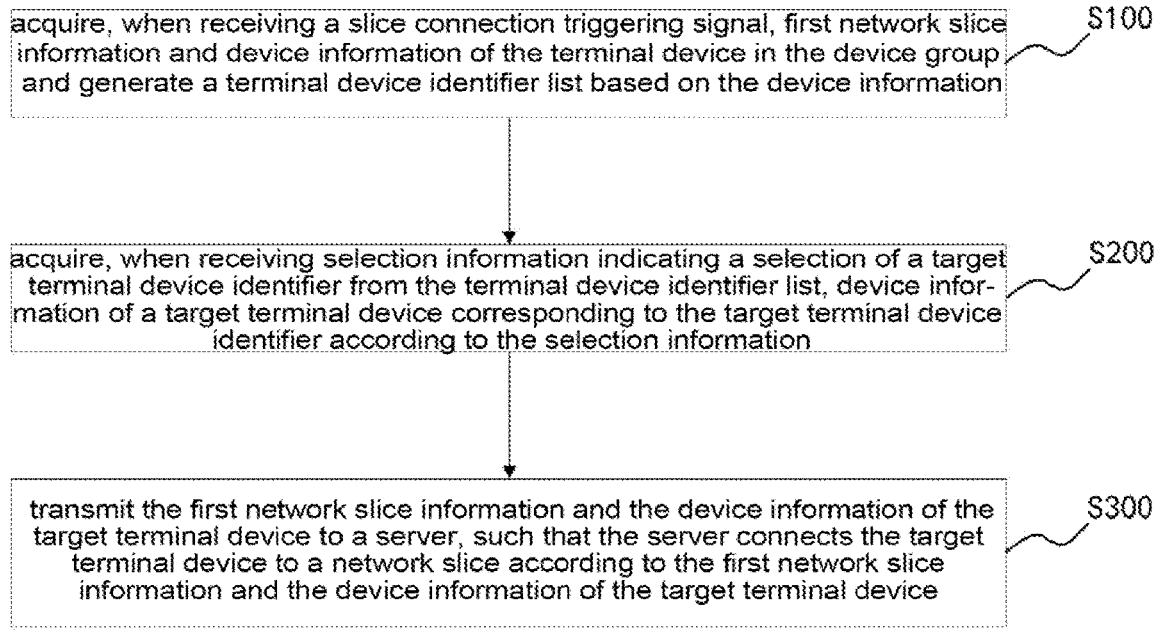
FIG. 2 is a flowchart of a network slice connection method according to an embodiment of the present application.

As shown in FIG. 2, FIG. 2 is a flowchart of a network slice connection method according to an embodiment of the present application. The network slice connection method is applicable to a terminal device in a same device group. The network slice connection method includes, but not limited to, S100, S200 and S300.

At S100, when receiving a slice connection triggering signal, first network slice information and device information of the terminal device in the device group are acquired and a terminal device identifier list is generated according to the device information.

In an embodiment, when the terminal device receives the slice connection triggering signal, the terminal device acquires the first network slice information and the device information of the terminal devices in the device group. The first network slice information is information related to a network slice to be connected. The first network slice information includes, but not limited to, information such as a DNN, a terminal device application identity (Application ID), and a Fully Qualified Domain Name (FQDN). Then, the terminal device generates the terminal device identifier list according to the device information, for the user to select a target terminal device that needs to be connected to a network slice. Since the current terminal device acquires the first network slice information and the device information, the current terminal device may initiate a network slice connection request for a target terminal device in subsequent steps, without needing to use the target terminal device to apply to the server for connecting to a network slice.

In an embodiment, the slice connection triggering signal may be generated in different manners, which is not particularly limited in this embodiment. For example, the slice connection triggering signal may be generated by the user operating the terminal device. For example, the slice connection triggering signal is generated by the user triggering a relevant function button of the terminal device. For another example, the slice connection triggering signal may be generated automatically when the terminal device is powered on.

In an embodiment, the first network slice information may be network slice information corresponding to the current terminal device, or may be network slice information corresponding to another terminal device in the device group, or may include the network slice information corresponding to the current terminal device and the network slice information corresponding to the another terminal device in the device group, which is not particularly limited in this embodiment. For example, when the first network slice information is the network slice information corresponding to the current terminal device, the first network slice information may be directly read from the current terminal device, or the first network slice information may be acquired through the server. For another example, when the first network slice information is the network slice information corresponding to the another terminal device in the device group, the first network slice information may be acquired through the server. For still another example, when the first network slice information includes the network slice information corresponding to the current terminal device and the network slice information corresponding to the another terminal device in the device group, the first network slice information may be acquired through the server, or the network slice information corresponding to the current terminal device is read from the terminal device and the network slice information corresponding to the another terminal device in the device group is acquired through the server.

In an embodiment, the device information includes, but not limited to, an International Mobile Subscriber Identity (IMSI), an International Mobile Equipment Identity (IMEI), and the like. When the device information of the terminal devices in the device group is stored in the current terminal device in advance, the device information of the terminal devices in the device group may be directly read from the current terminal device. When the device information of the terminal devices in the device group is not stored in the current terminal device, the device information of the terminal devices in the device group may be acquired from the server.

In an embodiment, after generating the terminal device identifier list according to the device information of the terminal devices in the device group, the terminal device may display the terminal device identifier list on a display screen of the terminal device, such that the user can select a target terminal device that needs to be connected to a network slice in the terminal device identifier list.

At S200, when receiving selection information indicating a selection of a target terminal device identifier from the terminal device identifier list, device information of a target terminal device corresponding to the target terminal device identifier is acquired according to the selection information.

In an embodiment, after generating the terminal device identifier list according to the acquired device information of the terminal devices in the device group, the terminal device displays the terminal device identifier list to the user, and waits for the user to select a target terminal device that needs to be connected to a network slice in the terminal device identifier list. After the user operates on the display screen of the terminal device to select the target terminal device identifier corresponding to the target terminal device, the terminal device receives selection information indicating selection of the target terminal device identifier from the terminal device identifier list. In this case, the terminal device acquires the device information of the target terminal device corresponding to the target terminal device identifier according to the selection information, such that the target terminal device can be connected to a network slice by utilizing the device information of the target terminal device in subsequent steps.

At S300, the first network slice information and the device information of the target terminal device are transmitted to the server, such that the server connects the target terminal device to a network slice according to the first network slice information and the device information of the target terminal device.

In an embodiment, after acquiring the first network slice information and the device information of the target terminal device, the terminal device transmits the first network slice information and the device information of the target terminal device to the server. After receiving the first network slice information and the device information of the target terminal device, the server can connect the target terminal device to a network slice according to the first network slice information and the device information of the target terminal device.

In an embodiment, by utilizing the network slice connection method including the above steps S100, S200 and S300, the terminal device acquires first network slice information and device information of the terminal device in the device group and generates a terminal device identifier list according to the device information when receiving a slice connection triggering signal. When receiving selection information indicating a selection of a target terminal device identifier from the terminal device identifier list, the terminal device acquires device information of a target terminal device corresponding to the target terminal device identifier according to the selection information, and transmits the first network slice information and the device information of the target terminal device to a server, such that the server can connect the target terminal device to a network slice according to the first network slice information and the device information of the target terminal device. Therefore, by utilizing only one terminal device, the user can realize the connection of target terminal devices belonging to the same device group as the terminal device to a network slice, and the terminal devices do not need to separately apply to the server for connecting to a network slice, thereby improving user experience.

In addition, in an embodiment, when the current terminal device applies for connecting to a network slice, the current terminal device may synchronously apply for connecting another terminal device belonging to the same device group as the current terminal device to a network slice. In this case, referring to FIG. 3, the acquiring first network slice information and device information of the terminal device in the device group in S100 may include, but not limited to, the following steps S110 to S130.

At S110, the first network slice information is read.

At S120, a terminal device information request message is transmitted to the server.

At S130, the device information of the terminal devices in the device group which is fed back by the server according to the terminal device information request message is acquired.

In an embodiment, when applying for connecting to a network slice, the current terminal device may directly read the first network slice information from the current terminal device, transmit a terminal device information request message for another terminal device in the device group to the server, and acquire the device information of the another terminal device in the device group which is fed back by the server according to the terminal device information request message, such that in subsequent steps, the current terminal device can apply for connecting the target terminal device to a network slice with the same name as the network slice to which the current terminal device needs to be connected, according to the first network slice information and the device information of the target terminal device selected by the user from the device information.

In an embodiment, the terminal device information request message may be a request message for requesting to acquire the device information of all the other terminal devices in the device group, or a request message for requesting to acquire the device information of other online terminal devices in the device group, which is not particularly limited in this embodiment. When the terminal device information request message is the request message for requesting to acquire the device information of all the other terminal devices in the device group, the terminal device acquires the device information of all the other terminal devices in the device group, and generates a terminal device identifier list corresponding to all the other terminal devices in the device group. When the terminal device information request message is the request message for requesting to acquire the device information of the other online terminal devices in the device group, the terminal device acquires only the device information of the other online terminal devices in the device group, and generates a terminal device identifier list corresponding to the other online terminal devices in the device group.

Figure 4:
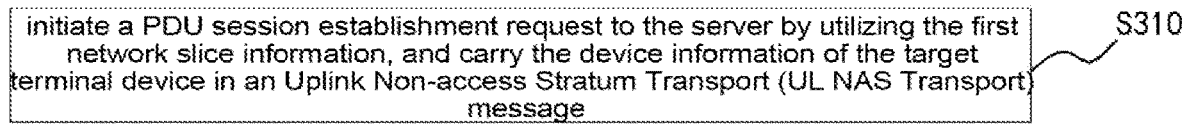
FIG. 4 is a flowchart of steps for transmitting the first network slice information and device information of a target terminal device to a server in a network slice connection method according to another embodiment of the present application.

In addition, in an embodiment, in a case that the current terminal device applies for connecting another terminal device belonging to the same device group as the current terminal device to a network slice with the same name as the network slice to which the current terminal device needs to be connected, referring to FIG. 4, the transmitting the first network slice information and the device information of the target terminal device to a server in S300 may include, but not limited to, a following step S310.

At S310, a PDU session establishment request is initiated to the server by utilizing the first network slice information, and the device information of the target terminal device is carried in an Uplink Non-access Stratum Transport (UL NAS Transport) message.

In an embodiment, after the terminal device acquires the first network slice information and the device information of the target terminal device, because the first network slice information includes the DNN and other information, when the terminal device finds a matching S-NSSAI in a UE Route Selection Policy (URSP) rule list stored in the terminal device according to the DNN, the terminal device initiates a PDU session establishment request to the server, and carries the S-NSSAI in signaling and carries the device information of the target terminal device in an UL NAS Transport message. When the terminal device receives a reply message of accepting the establishment of a PDU session that is transmitted by the server according to the S-NSSAI and the device information of the target terminal device, the establishment process of the PDU session between the terminal device and the server is complete, such that the current terminal device and the target terminal device are both connected to the network slice. Therefore, by utilizing only one terminal device, the user can realize the connection of target terminal devices belonging to the same device group as the terminal device to a network slice, and the terminal devices do not need to separately apply to the server for connecting to a network slice, thereby improving user experience.

In an embodiment, in a case that the current terminal device applies for connecting another terminal device belonging to the same device group as the current terminal device to a network slice with the same name as the network slice to which the current terminal device needs to be connected, the current terminal device may apply for connecting only terminal devices in the device group that are registered in the same 5G cell as the current terminal device to the network slice, so as to improve the success rate in connecting to the network slice.

Figure 5:
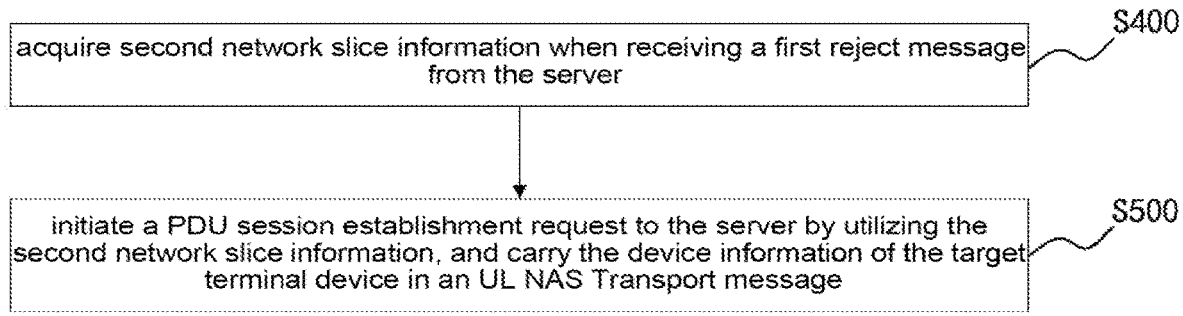
FIG. 5 is a flowchart of a network slice connection method according to another embodiment of the present application.

In addition, in an embodiment, after S310, referring to FIG. 5, the network slice connection method may further include, but not limited to, the following steps S400 to S500.

At S400, second network slice information is acquired when receiving a first reject message from the server.

At S500, a PDU session establishment request is initiated to the server by utilizing the second network slice information, and the device information of the target terminal device is carried in an UL NAS Transport message.

In an embodiment, if the terminal device does not receive the reply message of accepting the establishment of the PDU session from the server but receives the first reject message from the server after the terminal device initiates the PDU session establishment request to the server, it indicates that the server does not allow the terminal device to connect to the network slice currently being applied for. In this case, the terminal device may acquire the second network slice information, initiate a PDU session establishment request to the server by utilizing the second network slice information, and carry the device information of the target terminal device in an UL NAS Transport message. That is, the terminal device may re-apply to the server for connecting to a new network slice, and apply for connecting target terminal devices belonging to the same device group as the terminal device to the network slice with the same name as the new network slice, thereby improving the success rate in connecting the current terminal device and the target terminal devices to the network slice. It is worth noting that if the terminal device still has not received the reply message for accepting the establishment of the PDU session after initiating the PDU session establishment request to the server by utilizing the second network slice information, the terminal device may re-acquire other new network slice information until the network slice is successfully connected. If none of network slices subscribed to by the terminal device is successfully connected, the terminal device may feed back connection failure information or network connection abnormality information to the user to inform the user that the connection to the network slice is unsuccessful.

In an embodiment, the first reject message may be a PDU Session Establishment Reject message from the server, and carries a cause of Insufficient Resource.

In an embodiment, the terminal device may acquire the second network slice information by the following steps: performing, by the terminal device, URSP rule matching again to determine whether there are other available network slices, and when there is an available network slice, acquiring network slice information corresponding to the available network slice (i.e., second network slice information).

Figure 6:
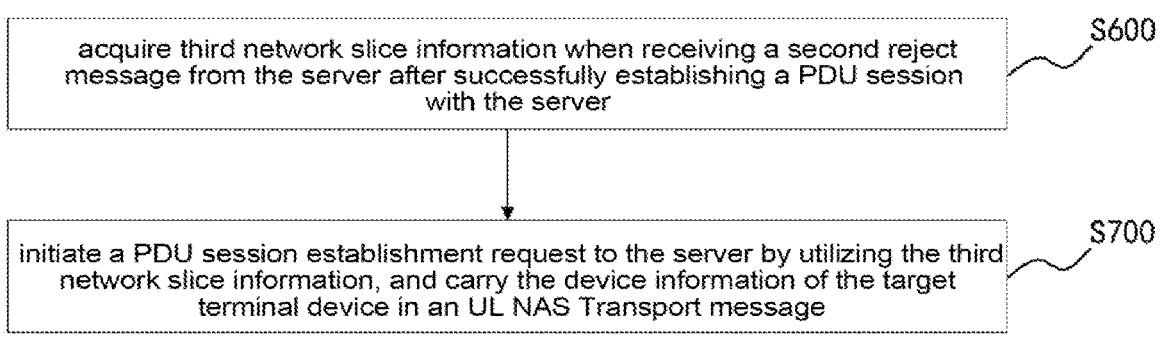
FIG. 6 is a flowchart of a network slice connection method according to another embodiment of the present application.

In addition, in an embodiment, referring to FIG. 6, the network slice connection method may further include, but not limited to, the following steps S600 to S700.

At S600, third network slice information is acquired when receiving a second reject message from the server after successfully establishing a PDU session with the server.

At S700, a PDU session establishment request is initiated to the server by utilizing the third network slice information, and the device information of the target terminal device is carried in an UL NAS Transport message.

In an embodiment, when the terminal device receives the second reject message from the server after the terminal device successfully establishes the PDU session with the server, it indicates that the network slice connection fails due to a network reason. In this case, the terminal device may acquire the third network slice information, initiate a PDU session establishment request to the server by utilizing the third network slice information, and carry the device information of the target terminal device in an UL NAS Transport message. That is, the terminal device may re-apply to the server for connecting to a new network slice, and apply for connecting target terminal devices belonging to the same device group as the terminal device to the network slice with the same name as the new network slice, so as to maintain the normal use of the network slice by the current terminal device and the target terminal devices. It is worth noting that if the terminal device still receives the second reject message from the server after initiating the PDU session establishment request to the server by utilizing the third network slice information, the terminal device may acquire other new network slice information until the network slice is stably connected to. If access to all network slices subscribed to by the terminal device is rejected, the terminal device may feed back connection failure information or network connection abnormality information to the user to inform the user that the connection to the network slice is unsuccessful.

In an embodiment, the second reject message may be a PDU session modification reject message or a PDU session release message from the server, and carries a cause of Insufficient Resource.

In an embodiment, the terminal device may acquire the third network slice information by the following steps: performing, by the terminal device, URSP rule matching again to determine whether there are other available network slices, and when there is an available network slice, and acquiring network slice information corresponding to the available network slice (i.e., third network slice information).

Figure 7:
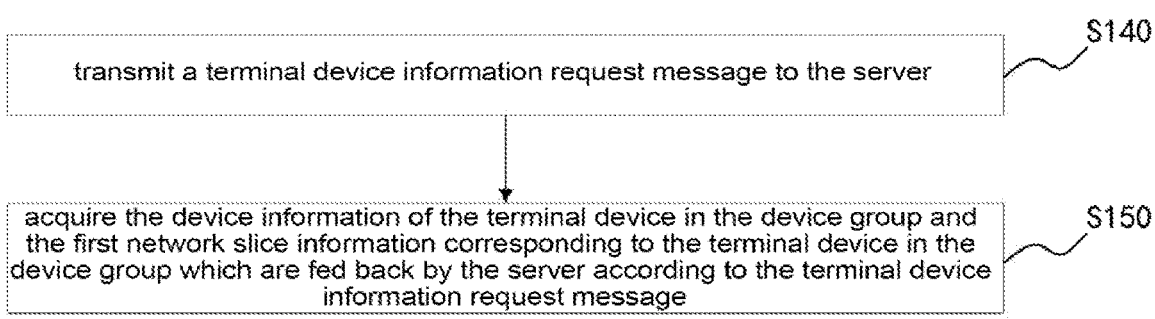
FIG. 7 is a flowchart of steps for acquiring first network slice information and device information of the terminal device in the device group in a network slice connection method according to another embodiment of the present application.

In addition, in an embodiment, in a case that the current terminal device is not triggered to directly apply for connecting the terminal devices to a network slice, but a user selects a terminal device(s) in the device group to apply for connecting to the network slice, referring to FIG. 7, the acquiring first network slice information and device information of the terminal device in the device group in S100 may include, but not limited to, the following steps S140 and S150.

At S140, a terminal device information request message is transmitted to the server.

At S150, the device information of the terminal devices in the device group and the first network slice information corresponding to the terminal devices in the device group which are fed back by the server according to the terminal device information request message are acquired.

In an embodiment, that the user selects a terminal device in the device group to apply for connecting to the network slice may be selecting any one or more terminal devices in the device group to apply for connecting to the network slice, which is not particularly limited in this embodiment. in an example, the user clicks to open a relevant Application (APP) of the terminal device to trigger a slice connection triggering signal. In this case, the current terminal device does not actively initiate a network slice connection request, but instead, first sends the terminal device information request message for all the terminal devices in the device group to the server, acquires the device information of all the terminal devices in the device group and a plurality of pieces of first network slice information corresponding to respective terminal devices in the device group which are fed back by the server according to the terminal device information request message, and then waits for the user to select the terminal device that needs to be connected to a network slice.

It is worth noting that the plurality of pieces of first network slice information corresponding to respective terminal devices in the device group may be information of network slices having the same name or network slices having different names, depending on the network slices subscribed to by the terminal devices, which is not particularly limited in this embodiment.

Figure 8:
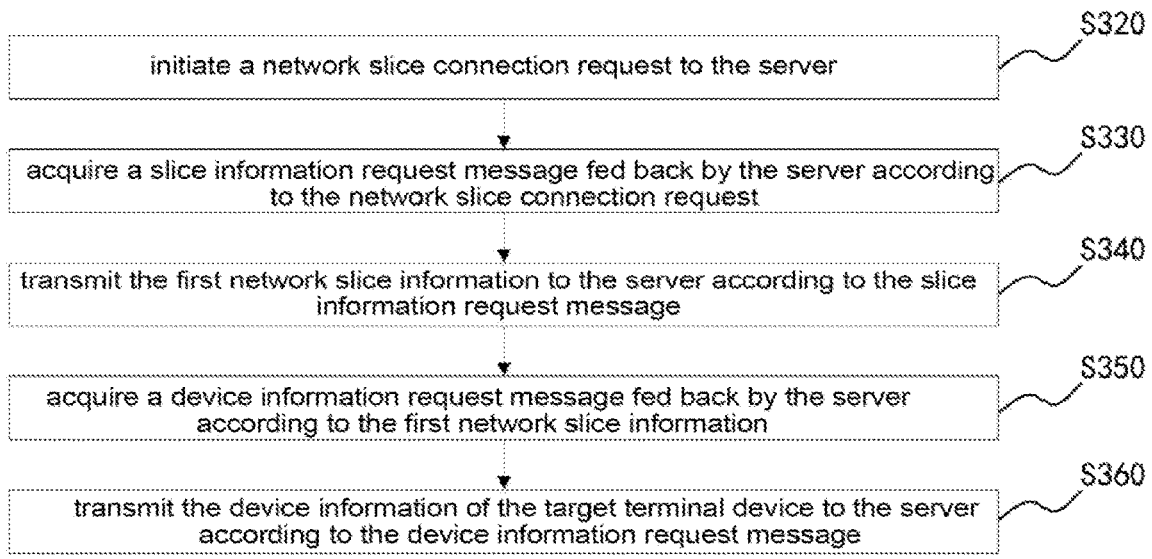
FIG. 8 is a flowchart of steps for transmitting the first network slice information and device information of a target terminal device to a server in a network slice connection method according to another embodiment of the present application.

In addition, in an embodiment, in a case that the current terminal device is not triggered to directly apply for connecting the terminal devices to a network slice, but a user selects a terminal device(s) in the device group to apply for connecting to the network slice, referring to FIG. 8, the transmitting the first network slice information and the device information of the target terminal device to a server in S300 may include, but not limited to, the following steps S320 to S360.

At S320, a network slice connection request is initiated to the server.

At S330, a slice information request message fed back by the server according to the network slice connection request is acquired.

At S340, the first network slice information is transmitted to the server according to the slice information request message.

At S350, a device information request message fed back by the server according to the first network slice information is acquired.

At S360, the device information of the target terminal device is transmitted to the server according to the device information request message.

In an embodiment, after the user selects the target terminal device identifier of the target terminal device that needs to be connected to the network slice in the terminal device identifier list, the current terminal device acquires the device information of the target terminal device corresponding to the target terminal device identifier. In addition, since the current terminal device has acquired the first network slice information corresponding to the target terminal device, the current terminal device may initiate the network slice connection request to the server, and transmit the first network slice information and the device information of the target terminal device to the server according to different request information transmitted from the server, such that the server can connect the target terminal device to a network slice according to the first network slice information and the device information of the target terminal device. Therefore, by utilizing only one terminal device, the user can realize the connection of target terminal devices belonging to the same device group as the terminal device to a network slice, and the terminal devices do not need to separately apply to the server for connecting to a network slice, thereby improving user experience.

In an embodiment, the target terminal device identifier selected by the user in the terminal device identifier list may include a terminal device identifier of the current terminal device, or may not include the terminal device identifier of the current terminal device, depending on an actual selection of the user.

It is worth noting that S330 and S340 may be executed prior to, after, or synchronously with S350 and S360, which is not particularly limited in this embodiment.

In an embodiment, in a case that the current terminal device applies for connecting another terminal device belonging to the same device group as the current terminal device to a network slice, the current terminal device may apply for connecting only the terminal devices in the device group that are registered in the same 5G cell as the current terminal device to the network slice, so as to improve the success rate in connecting to the network slice.

Figure 9:
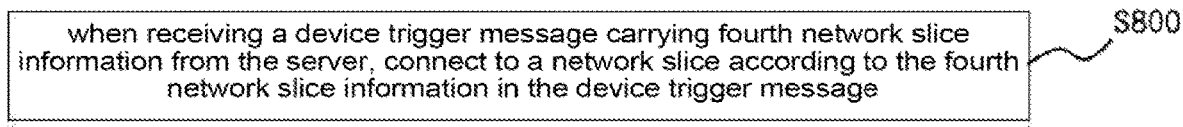
FIG. 9 is a flowchart of a network slice connection method according to another embodiment of the present application.

In addition, in an embodiment, referring to FIG. 9, the network slice connection method may further include, but not limited to, a following step S800.

At S800, when receiving a device trigger message carrying fourth network slice information from the server, a network slice is connected to according to the fourth network slice information in the device trigger message.

In an embodiment, when the current terminal device receives the device trigger message carrying the fourth network slice information from the server, it indicates that another terminal device belonging to the same device group as the current terminal device applies for connecting the current terminal device to the network slice. In this case, the current terminal device may establish a PDU session with the server according to the fourth network slice information carried in the device trigger message, so as to realize the connection of the current terminal device to the network slice. Therefore, by operating another terminal device belonging to the same device group as the current terminal device, the network slice connection request for the current terminal device can be realized without requiring the user to operate the current terminal device additionally. In this way, the network slice connection request for the terminal device can be realized more conveniently, thereby improving the user experience.

It is worth noting that the fourth network slice information is information related to a network slice subscribed to by the current terminal device that is acquired through the server by the another terminal device belonging to the same device group as the current terminal device.

In an embodiment, the device trigger message carries relevant information when the terminal device initiates a PDU session establishment request, e.g., a DNN, a terminal device identifier, device information, or terminal device application information, and the like. The specific information carried in the device trigger message may be determined according to an actual application, which is not particularly limited in this embodiment.

Figure 10:
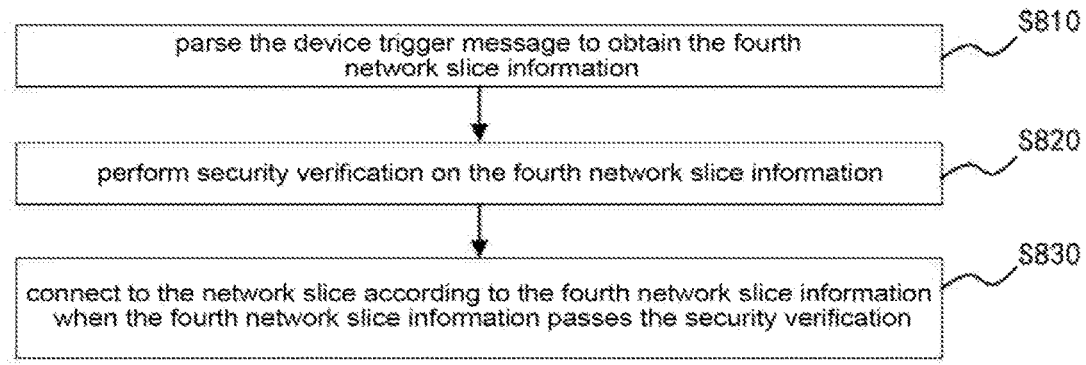
FIG. 10 is a flowchart of steps for connecting to a network slice according to fourth network slice information in a device trigger message in a network slice connection method according to another embodiment of the present application.

In addition, in an embodiment, referring to FIG. 10, the connecting to a network slice according to the fourth network slice information in the device trigger message in S800 may include, but not limited to. the following steps S810 to S830.

At S810, the device trigger message is parsed to obtain the fourth network slice information.

At S820, security verification is performed on the fourth network slice information.

At S830, the network slice is connected to according to the fourth network slice information when the fourth network slice information passes the security verification.

In an embodiment, after receiving the device trigger message carrying the fourth network slice information from the server, the terminal device may first parse the device trigger message to obtain the fourth network slice information carried in the device trigger message. Then, to ensure the security of connection of the terminal device to the network slice, the terminal device may perform security verification on the fourth network slice information. Only after the security verification is passed, the terminal device can be connected to the network slice according to the fourth network slice information, thereby improving the security of connection of the terminal device to the network slice.

To more clearly describe the steps and processes of the network slice connection method in the above embodiments, specific examples are described below.

Example One

Figure 11:
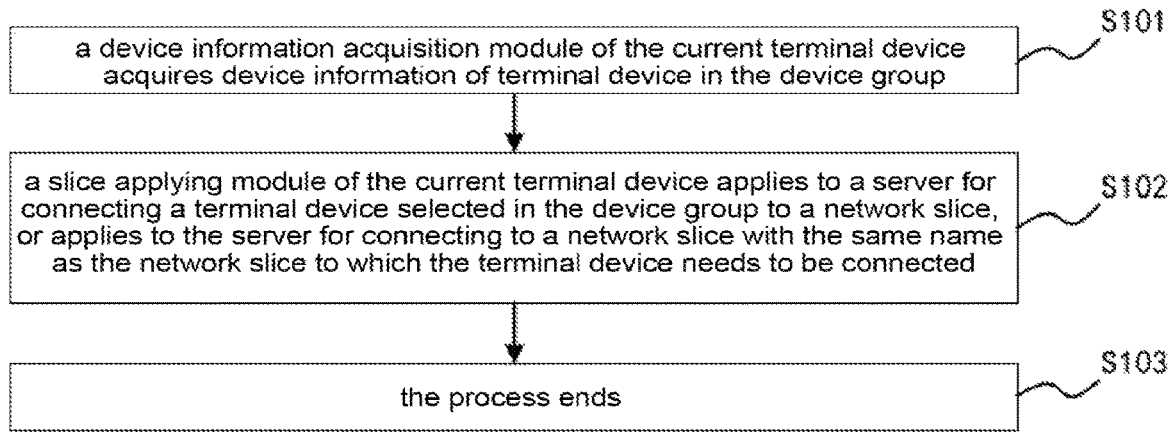
FIG. 11 is a flowchart of applying for connecting to a network slice by a current terminal device for another terminal device belonging to the same device group according to an example of the present application.

As shown in FIG. 11, FIG. 11 is a flowchart of applying for connecting to a network slice by a current terminal device for another terminal device belonging to the same device group according to an example of the present application. The process may include following steps S101 to S103.

At S101, a device information acquisition module of the current terminal device acquires device information of terminal devices in the device group.

At S102, a slice applying module of the current terminal device applies to a server for connecting a terminal device selected in the device group to a network slice, or applies to the server for connecting to a network slice with the same name as the network slice to which the terminal device needs to be connected.

At S103, the process ends.

Example Two

Figure 12:
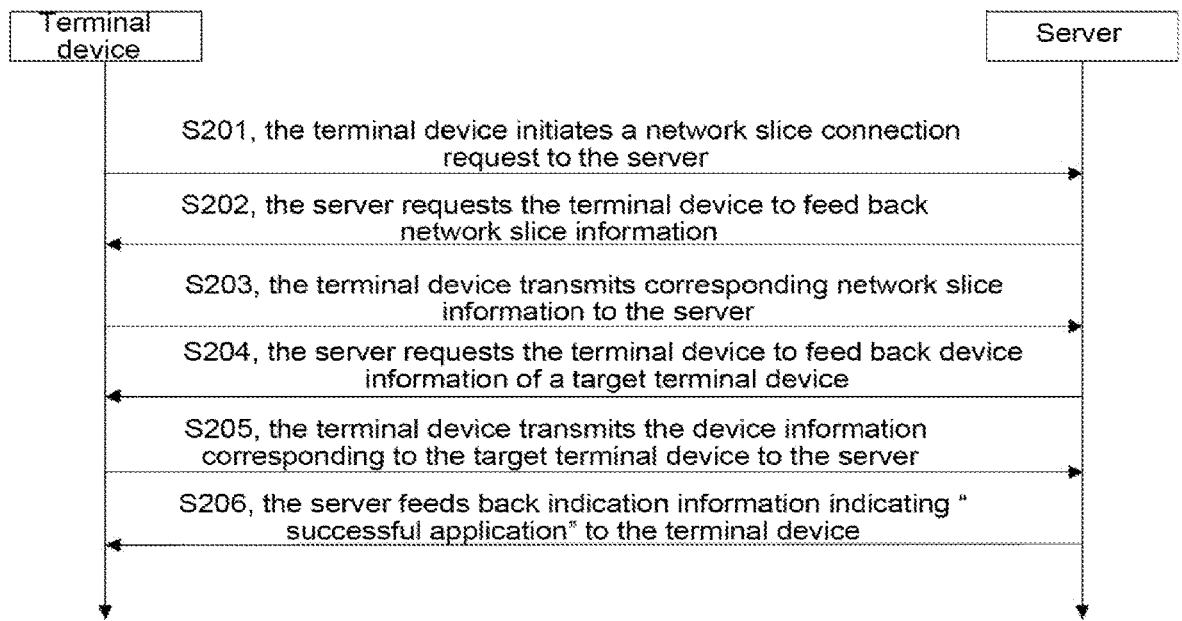
FIG. 12 is a flowchart of interaction between a current terminal device and a server when the current terminal device applies for connecting another terminal device in the device group to a network slice according to another example of the present application.

As shown in FIG. 12, FIG. 12 is a flowchart of interaction between a current terminal device and a server when the current terminal device applies for connecting another terminal device in the device group to a network slice according to another example of the present application. The process may include following steps S201 to S206.

At S201, the terminal device initiates a network slice connection request to the server.

At S202, the server requests the terminal device to feed back network slice information.

At S203, the terminal device transmits corresponding network slice information to the server.

At S204, the server requests the terminal device to feed back device information of a target terminal device.

At S205, the terminal device transmits the device information corresponding to the target terminal device to the server.

At S206, the server feeds back indication information indicating "successful application" to the terminal device.

Example Three

Figure 13:
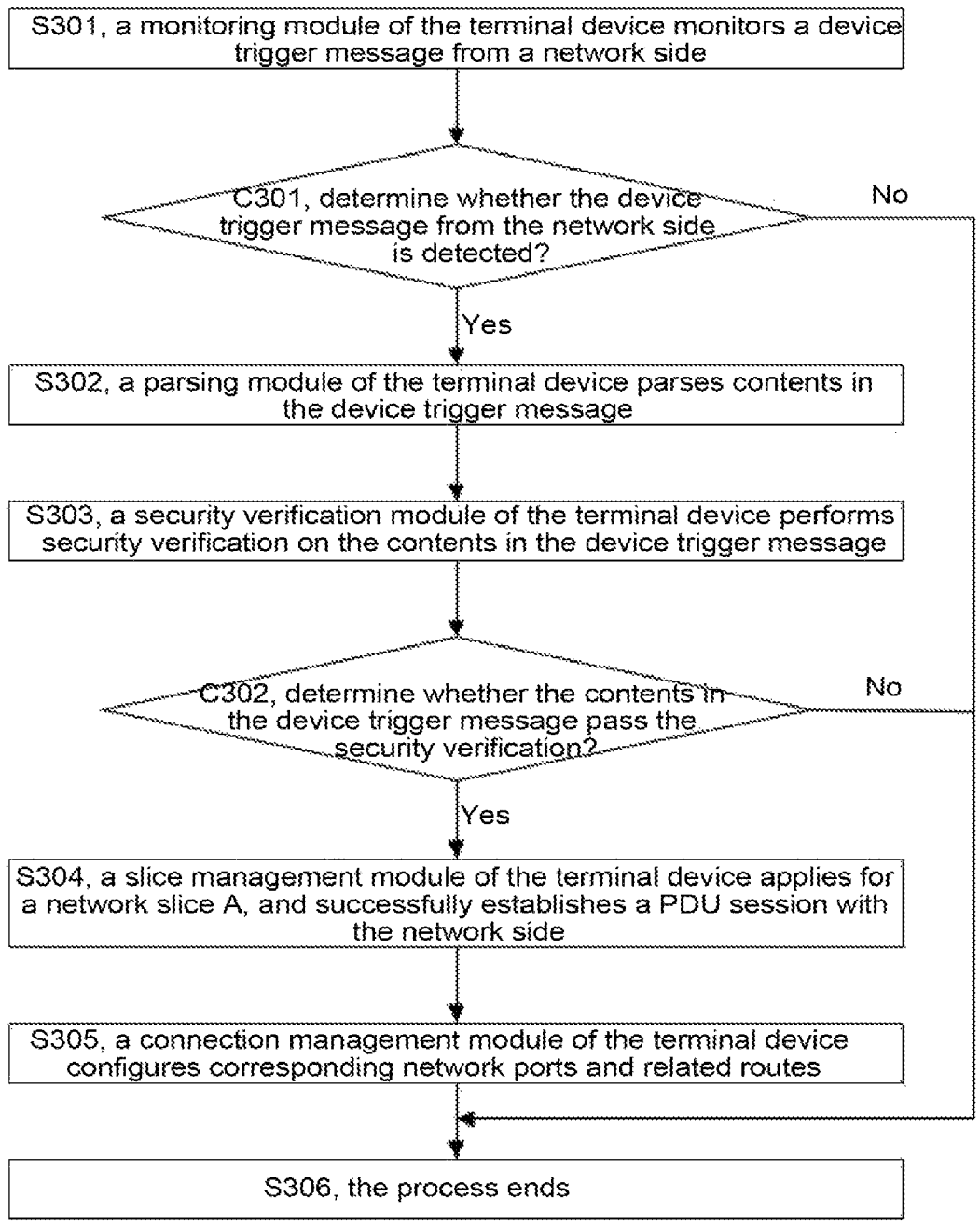
FIG. 13 is a flowchart of steps executed by a current terminal device when another terminal device in the device group applies for connecting the current terminal device to a network slice according to another example of the present application.

As shown in FIG. 13, FIG. 13 is a flowchart of steps executed by a current terminal device when another terminal device in the device group applies for connecting the current terminal device to a network slice according to another example of the present application. The process may include following steps S301 to S306.

At S301, a monitoring module of the terminal device monitors a device trigger message from a network side.

At C301, a determination is made as to whether the device trigger message from the network side is detected. If yes, S302 is executed, and if no, S306 is executed.

At S302, a parsing module of the terminal device parses contents in the device trigger message.

At S303, a security verification module of the terminal device performs security verification on the contents in the device trigger message.

At C302, a determination is made as to whether the contents in the device trigger message pass the security verification. If yes, S304 is executed, and if no, S306 is executed.

At S304, a slice management module of the terminal device applies for a network slice A, and successfully establishes a PDU session with the network side.

At S305, a connection management module of the terminal device configures corresponding network ports and related routes.

At S306, the process ends.

Example Four

Figure 14:
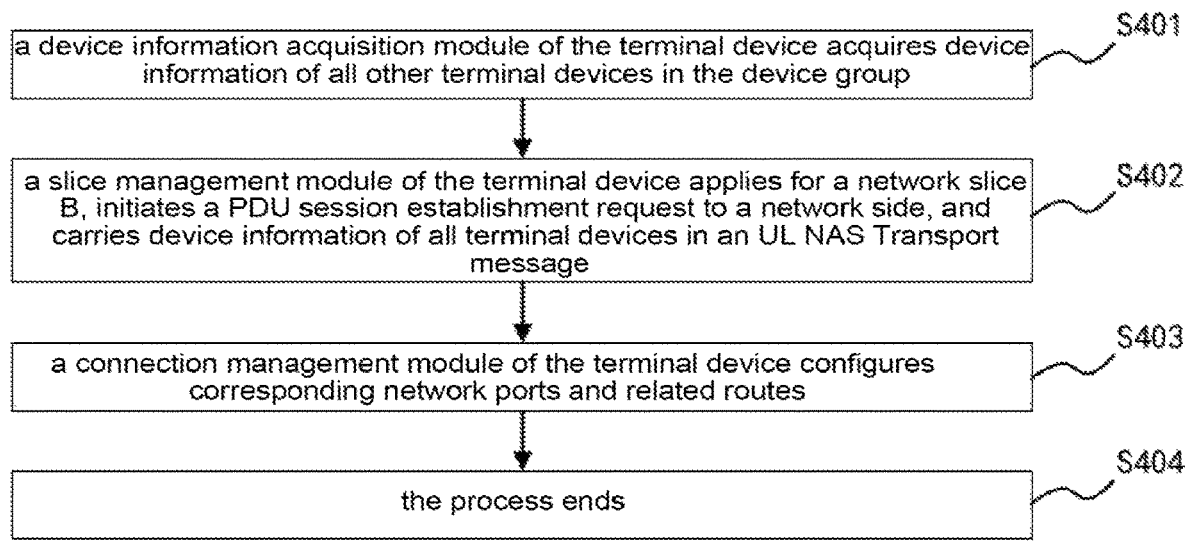
FIG. 14 is a flowchart of steps executed by a current terminal device when the current terminal device applies for connecting all other terminal devices in the device group to a network slice according to another example of the present application.

As shown in FIG. 14, FIG. 14 is a flowchart of steps executed by a current terminal device when the current terminal device applies for connecting all other terminal devices in the device group to a network slice according to another specific example of the present application. The process may include following steps 401 to S404.

At S401, a device information acquisition module of the terminal device acquires device information of all other terminal devices in the device group.

At S402, a slice management module of the terminal device applies for a network slice B, initiates a PDU session establishment request to a network side, and carries device information of all terminal devices in an UL NAS Transport message.

At S403, a connection management module of the terminal device configures corresponding network ports and related routes.

At S404, the process ends.

Example Five

Figure 15:
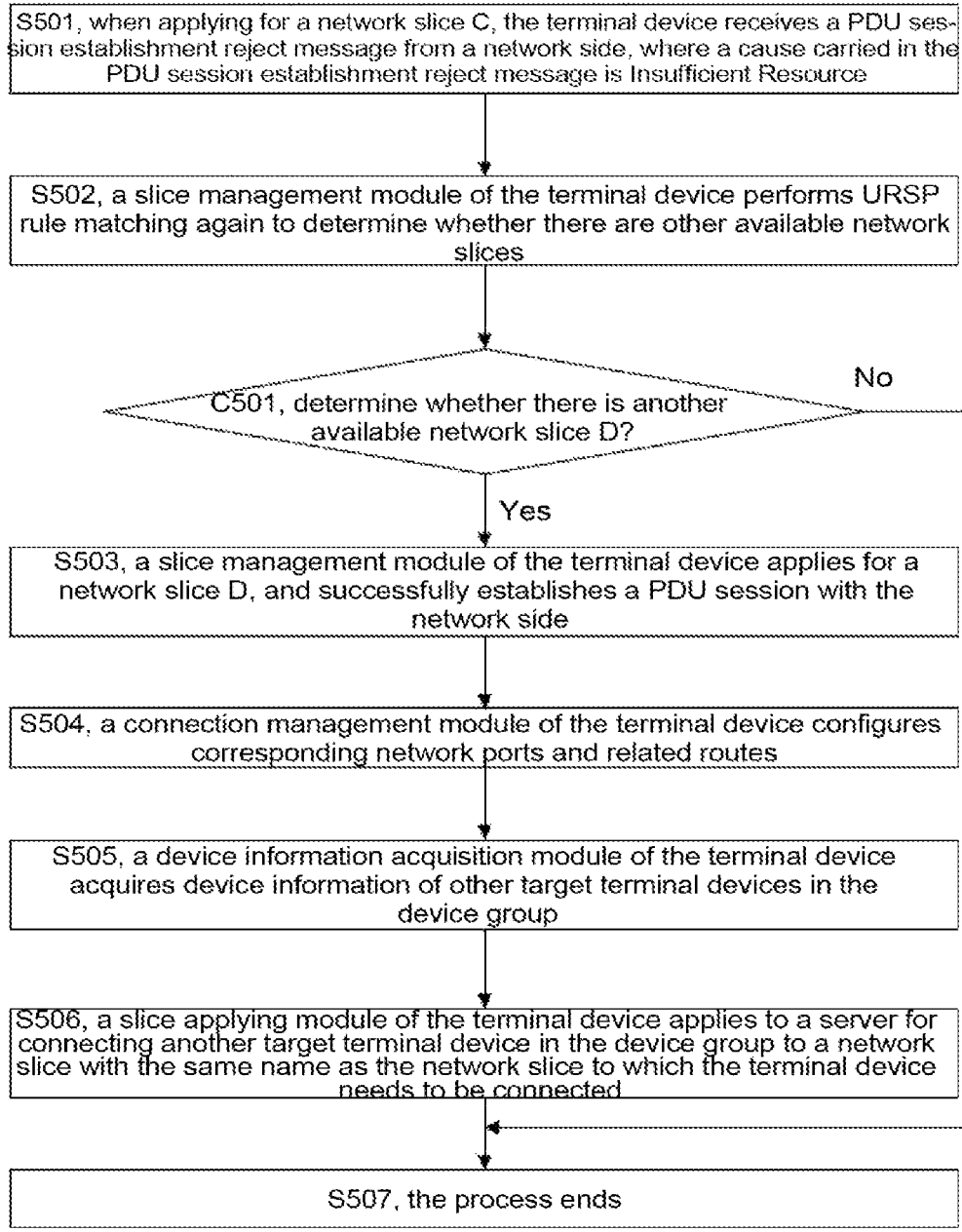
FIG. 15 is a flowchart of a method for solving congestion when applying for a network slice according to another example of the present application.

As shown in FIG. 15, FIG. 15 is a flowchart of a method for solving congestion when applying for a network slice according to another example of the present application. The process may include following steps 501 to S507.

At S501, when applying for a network slice C, the terminal device receives a PDU session establishment reject message from a network side, where a cause carried in the PDU session establishment reject message is Insufficient Resource.

At S502, a slice management module of the terminal device performs URSP rule matching again to determine whether there are other available network slices.

At C501, a determination is made as to whether there is another available network slice D.

If yes, S503 is executed, and if no, S507 is executed.

At S503, a slice management module of the terminal device applies for a network slice D, and successfully establishes a PDU session with the network side.

At S504, a connection management module of the terminal device configures corresponding network ports and related routes.

At S505, a device information acquisition module of the terminal device acquires device information of other target terminal devices in the device group.

At S506, a slice applying module of the terminal device applies to a server for connecting another target terminal device in the device group to a network slice with the same name as the network slice to which the terminal device needs to be connected.

At S507, the process ends.

Example Six

Figure 16:
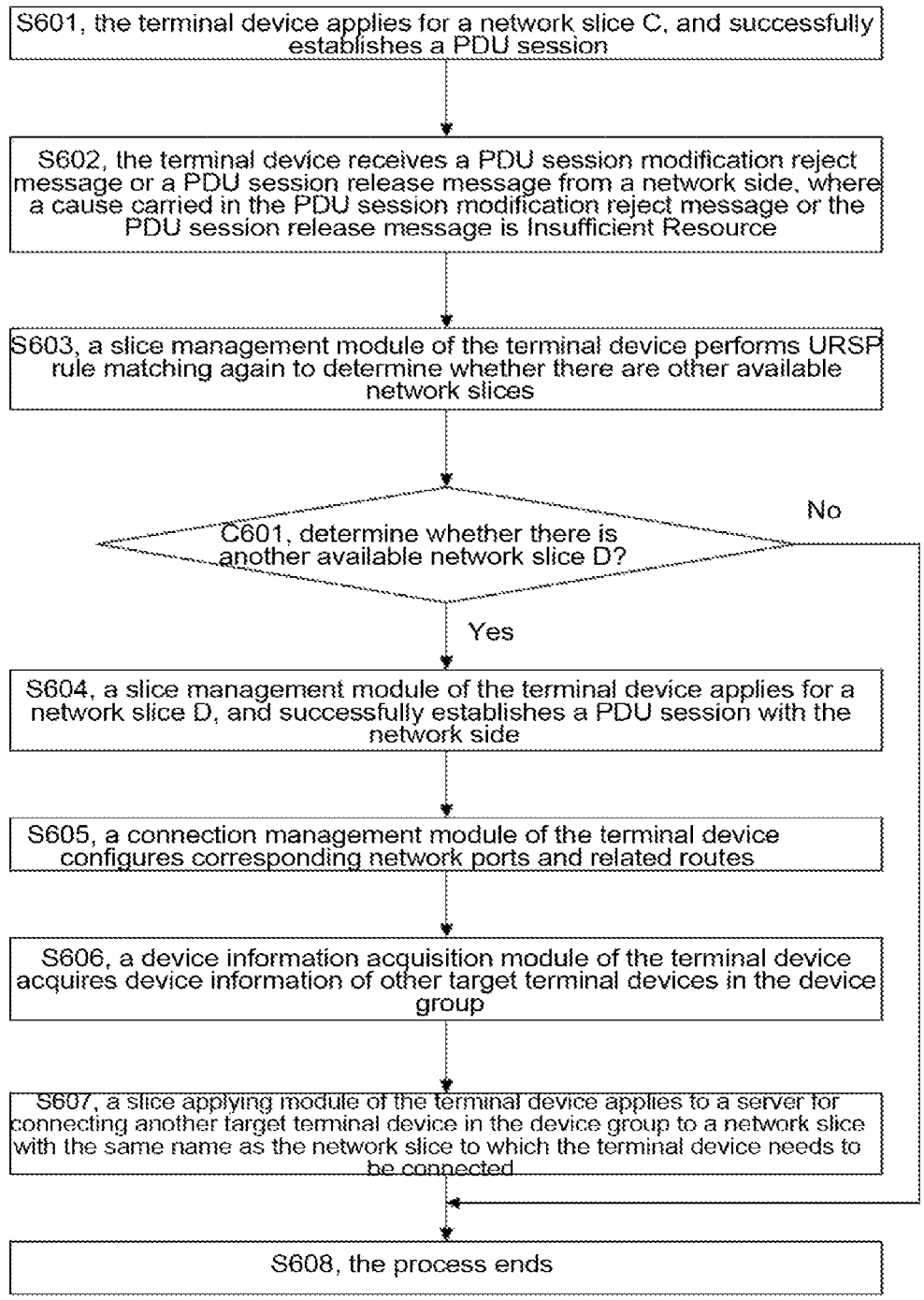
FIG. 16 is a flowchart of a method for solving congestion after a successful connection to a network slice according to another example of the present application.

As shown in FIG. 16, FIG. 16 is a flowchart of a method for solving congestion after a successful connection to a network slice according to another example of the present application. The process may include following steps 601 to S608.

At S601, the terminal device applies for a network slice C, and successfully establishes a PDU session.

At S602, the terminal device receives a PDU session modification reject message or a PDU session release message from a network side, where a cause carried in the PDU session modification reject message or the PDU session release message is Insufficient Resource.

At S603, a slice management module of the terminal device performs URSP rule matching again to determine whether there are other available network slices.

At C601, a determination is made as to whether there is another available network slice D. If yes, S604 is executed, and if no, S608 is executed.

At S604, a slice management module of the terminal device applies for a network slice D, and successfully establishes a PDU session with the network side.

At S605, a connection management module of the terminal device configures corresponding network ports and related routes.

At S606, a device information acquisition module of the terminal device acquires device information of other target terminal devices in the device group.

At S607, a slice applying module of the terminal device applies to a server for connecting another target terminal device in the device group to a network slice with the same name as the network slice to which the terminal device needs to be connected.

At S608, the process ends.

In addition, an embodiment of the present application further provides a terminal device, including: a memory, a processor, and a computer program stored in the memory and executable by the processor.

The processor and the memory may be connected by a bus or in other ways.

The memory, as a non-transitory computer-readable storage medium, may be configured for storing a non-transitory software program and a non-transitory computer-executable program. In addition, the memory may include a high-speed random access memory, and may also include a non-transitory memory, e.g., at least one magnetic disk storage device, flash memory device, or other non-transitory solid-state storage device. In some implementations, the memory may include memories located remotely from the processor, and the remote memories may be connected to the processor via a network. Examples of the network include, but not limited to, the Internet, an intranet, a local area network, a mobile communication network, and combinations thereof.

It should be noted that the terminal device in this embodiment may include the system architecture in the embodiment shown in FIG. 1. Therefore, the terminal device in this embodiment and the system architecture in the embodiment shown in FIG. 1 belong to the same inventive concept, and these embodiments have the same implementation principle and technical effects, so the details will not be repeated here.

Figure 3:
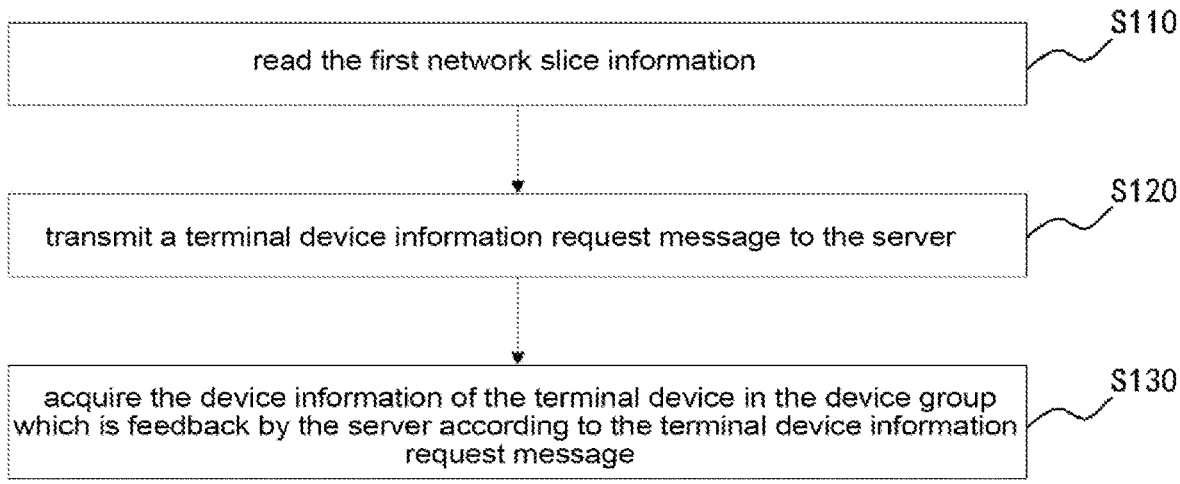
FIG. 3 is a flowchart of steps for acquiring first network slice information and device information of the terminal device in the device group in a network slice connection method according to another embodiment of the present application.

The non-transitory software program and instructions required to implement the network slice connection method of the foregoing embodiments are stored in the memory which, when executed by the processor, cause the processor to execute the network slice connection method of the foregoing embodiments, for example, execute the method steps S100 to S300 in FIG. 2, the method steps S110 to S130 in FIG. 3, the method step S310 in FIG. 4, the method steps S400 to S500 in FIG. 5, the method steps S600 to S700 in FIG. 6, the method steps S140 to S150 in FIG. 7, the method steps S320 to S360 in FIG. 8, the method step S800 in FIG. 9, and the method steps S810 to S830 in FIG. 10.

The apparatus embodiments described above are merely examples. The units described as separate components may or may not be physically separated, i.e., may be located in one place or may be distributed over a plurality of network units. Some or all of the modules may be selected according to actual needs to achieve the objects of the scheme of this embodiment.

In addition, an embodiment of the present application further provides a computer-readable storage medium, storing computer-executable instructions which, when executed by a processor or controller, for example, by a processor in the terminal device embodiment described above, may cause the processor to execute the network slice connection method in the above embodiments, for example, to execute the method steps S100 to S300 in FIG. 2, the method steps S110 to S130 in FIG. 3, the method step S310 in FIG. 4, the method steps S400 to S500 in FIG. 5, the method steps S600 to S700 in FIG. 6, the method steps S140 to S150 in FIG. 7, the method steps S320 to S360 in FIG. 8, the method step S800 in FIG. 9, and the method steps S810 to S830 in FIG. 10.

Those having ordinary skills in the art can understand that all or some of the steps and systems in the method disclosed above may be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information such as computer-readable instructions, data structures, program modules, or other data. A computer storage medium may include, but not limited to, a random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier wave or other transport mechanism, and may include any information passing medium.

Although some implementations of the present application have been described above, the present application is not limited to the implementations described above. Those having ordinary skills in the art can make various equivalent modifications or replacements without departing from the scope of the present application. Such equivalent modifications or replacements fall within the scope defined by the claims of the present application.

The invention claimed is:

1. A network slice connection method, applicable to a terminal device in a same device group, the method comprising:

acquiring, in response to acquiring a slice connection triggering signal, first network slice information and device information of the terminal device in the device group and generating a terminal device identifier list according to the device information;

acquiring, in response to acquiring selection information indicating a selection of a target terminal device identifier from the terminal device identifier list, device information of a target terminal device corresponding to the target terminal device identifier according to the selection information; and transmitting the first network slice information and the device information of the target terminal device to a server, such that the server connects the target terminal device to a network slice related to the first network slice information according to the first network slice information and the device information of the target terminal device.

2. The method of claim 1, wherein acquiring first network slice information and device information of the terminal device in the device group comprises:
reading the first network slice information;
transmitting a terminal device information request message to the server; and
acquiring the device information of the terminal devices in the device group which is fed back by the server according to the terminal device information request message.

3. The method of claim 2, wherein transmitting the first network slice information and the device information of the target terminal device to a server comprises:
initiating a Protocol Data Unit (PDU) session establishment request to the server by utilizing the first network slice information, and carrying the device information of the target terminal device in an uplink non-access stratum transport message.

4. The method of claim 3, after initiating a PDU session establishment request to the server by utilizing the first network slice information, and carrying the device information of the target terminal device in an Uplink Non-access Stratum Transport (UL NAS Transport) message, the method further comprising:
acquiring second network slice information in response to receiving a first reject message from the server; and
initiating a PDU session establishment request to the server by utilizing the second network slice information, and carrying the device information of the target terminal device in an UL NAS Transport message.

5. The method of claim 4, further comprising:
acquiring third network slice information in response to receiving a second reject message from the server after successfully establishing a PDU session with the server; and
initiating a PDU session establishment request to the server by utilizing the third network slice information, and carrying the device information of the target terminal device in an UL NAS Transport message.

6. The method of claim 3, further comprising:
acquiring third network slice information in response to receiving a second reject message from the server after successfully establishing a PDU session with the server; and
initiating a PDU session establishment request to the server by utilizing the third network slice information, and carrying the device information of the target terminal device in an UL NAS Transport message.

7. The method of claim 1, wherein acquiring first network slice information and device information of the terminal device in the device group comprises:
transmitting a terminal device information request message to the server; and
acquiring the device information of the terminal devices in the device group and the first network slice information corresponding to the terminal devices in the device group which are fed back by the server according to the terminal device information request message.

8. The method of claim 7, wherein transmitting the first network slice information and the device information of the target terminal device to a server comprises:
initiating a network slice connection request to the server;
acquiring a slice information request message fed back by the server according to the network slice connection request;
transmitting the first network slice information to the server according to the slice information request message;
acquiring a device information request message fed back by the server according to the first network slice information; and
transmitting the device information of the target terminal device to the server according to the device information request message.

9. The method of claim 1, further comprising:
in response to receiving a device trigger message carrying fourth network slice information from the server, connecting to a network slice according to the fourth network slice information in the device trigger message.

10. The method of claim 9, wherein connecting to a network slice according to the fourth network slice information in the device trigger message comprises:
parsing the device trigger message to obtain the fourth network slice information;
performing security verification on the fourth network slice information; and
connecting to the network slice according to the fourth network slice information in response to the fourth network slice information passing the security verification.

11. The method of claim 1, in response to the first network slice information being network slice information corresponding to the terminal device, directly reading the first network slice information from the terminal device.

12. The method of claim 1, in response to the first network slice information being network slice information corresponding to another terminal device in the device group, acquiring the first network slice information through the server.

13. The method of claim 1, after generating the terminal device identifier list according to the device information, displaying the terminal device identifier list on a display screen of the terminal device.

14. A terminal device, comprising: a memory, a processor, and a computer program stored in the memory and executable by the processor which, when executed by the processor, causes the processor to perform a network slice connection method, applicable to a terminal device in a same device group, the method comprising:
acquiring, in response to acquiring a slice connection triggering signal, first network slice information and device information of the terminal device in the device group and generating a terminal device identifier list according to the device information;
acquiring, in response to acquiring selection information indicating a selection of a target terminal device identifier from the terminal device identifier list, device information of a target terminal device corresponding to the target terminal device identifier according to the selection information; and
transmitting the first network slice information and the device information of the target terminal device to a server, such that the server connects the target terminal device to a network slice related to the first network slice information according to the first network slice information and the device information of the target terminal device.

15. A non-transitory computer-readable storage medium, storing computer-executable instructions which, when executed by a processor, cause the processor to perform a network slice connection method, applicable to a terminal device in a same device group, the method comprising:
- acquiring, in response to acquiring a slice connection triggering signal, first network slice information and device information of the terminal device in the device group and generating a terminal device identifier list according to the device information;
- acquiring, in response to acquiring selection information indicating a selection of a target terminal device identifier from the terminal device identifier list, device information of a target terminal device corresponding to the target terminal device identifier according to the selection information; and
- transmitting the first network slice information and the device information of the target terminal device to a server, such that the server connects the target terminal device to a network slice related to the first network slice information according to the first network slice information and the device information of the target terminal device.

* * * * *